United States Patent
Kumagai et al.

(10) Patent No.: US 10,532,678 B2
(45) Date of Patent: Jan. 14, 2020

(54) SEAT PAD AND SEAT PAD PRODUCTION DEVICE

(71) Applicant: BRIDGESTONE CORPORATION, Tokyo (JP)

(72) Inventors: Kenji Kumagai, Tokyo (JP); Yoshiyuki Takahashi, Tokyo (JP); Toshimitsu Shinohara, Tokyo (JP); Taisuke Yonezawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/571,171

(22) PCT Filed: Apr. 22, 2016

(86) PCT No.: PCT/JP2016/062790
§ 371 (c)(1),
(2) Date: Nov. 1, 2017

(87) PCT Pub. No.: WO2016/190018
PCT Pub. Date: Dec. 1, 2016

(65) Prior Publication Data
US 2018/0257526 A1 Sep. 13, 2018

(30) Foreign Application Priority Data
May 28, 2015 (JP) ................................. 2015-108153

(51) Int. Cl.
*B60N 2/64* (2006.01)
*B60N 2/90* (2018.01)

(52) U.S. Cl.
CPC ............... *B60N 2/646* (2013.01); *B60N 2/90* (2018.02)

(58) Field of Classification Search
CPC ........... B60N 2/646; A47C 7/142; A47C 7/18; A47C 5/125
(Continued)

(56) References Cited

U.S. PATENT DOCUMENTS 5,160,785 A * 11/1992 Davidson, Jr. ........ A47C 27/146
297/DIG. 1
5,677,036 A * 10/1997 Kording .................... A61F 5/01
428/156
(Continued)

FOREIGN PATENT DOCUMENTS

EP   3 011 870 A1   4/2016
JP   8-197994 A     8/1996
(Continued)

OTHER PUBLICATIONS

International Search Report for PCT/JP2016/062790 dated Jul. 26, 2016 [PCT/ISA/210].
(Continued)

*Primary Examiner* — Joanne Silbermann
(74) *Attorney, Agent, or Firm* — Sughrue Mion, PLLC

(57) ABSTRACT

A seat pad (10) having a loading surface (11). In the seat pad (10), a lateral slit portion (15), extending from the outside towards the inside of the seat pad (10) in a first lateral direction (B1) that is parallel to the loading surface (11), is formed. A longitudinal slit portion (15) is provided at an end portion of the lateral slit portion (15), in a second lateral direction (B2) that is orthogonal to the first lateral direction (B1) and that is parallel to the loading surface (11). The longitudinal slit portion (21) extends from the lateral slit portion (15) towards the loading surface (11) in a thickness direction (H) that is orthogonal to the loading surface (11).

6 Claims, 7 Drawing Sheets

(58) Field of Classification Search
USPC .......... 297/452.21, 452.26, 452.35, DIG. 1; 5/724, 730
See application file for complete search history.

(56) References Cited

U.S. PATENT DOCUMENTS

| | | |
|---|---|---|
| 2010/0102615 A1 | 4/2010 | Yamauchi |
| 2018/0132620 A1* | 5/2018 | Kumagai ............... A47C 27/14 |
| 2018/0146787 A1* | 5/2018 | Kumagai ............... A47C 27/14 |
| 2018/0146788 A1* | 5/2018 | Kumagai ............... A47C 27/14 |

FOREIGN PATENT DOCUMENTS

| | | |
|---|---|---|
| JP | 11-056521 A | 3/1999 |
| JP | 2001-038747 A | 2/2001 |
| JP | 2006-149466 A | 6/2006 |
| JP | 2008-1214 A | 1/2008 |
| JP | 2012-61092 A | 3/2012 |
| JP | 2014-226181 A | 12/2014 |
| JP | 2014226181 A * | 12/2014 |
| JP | 2015-039556 A | 3/2015 |
| WO | 2004034853 A1 | 4/2004 |
| WO | 2014/203890 A1 | 12/2014 |

OTHER PUBLICATIONS

Communication dated Mar. 29, 2018 from the European Patent Office in counterpart application No. 16799726.1.
Search Report dated Jul. 2, 2019 from the State Intellectual Property Office of the P.R.C. in application No. 2016800302704.

* cited by examiner

SEAT PAD AND SEAT PAD PRODUCTION DEVICE

TECHNICAL FIELD

The present invention relates to a seat pad and a seat pad production device.

The present application is a National Stage of International Application No. PCT/JP2016/062790, filed on Apr. 22, 2016, which claims priority on Japanese Patent Application No. 2015-108153, filed May 28, 2015, the content of which is incorporated herein by reference.

BACKGROUND ART

Conventionally, seat pads such as those described, for example, in the below-mentioned Patent Document 1 are known.

RELATED DOCUMENT

Patent Document

[Patent Document 1]
JP 2006-149466 A

SUMMARY OF INVENTION

Technical Problem

However, the aforementioned conventional seat pads have room for improvement in terms of improving the sitting comfort (stroke sensation) so as to allow a stable posture to be maintained by sagging by an appropriate amount when a person is seated.

The present invention was made in consideration of the aforementioned circumstances, and has the purpose of improving the sitting comfort.

Solution to Problem

The present invention proposes the following means for solving the aforementioned problem.

The seat pad according to the present invention has a loading surface. In the seat pad, a lateral slit portion, extending from the outside towards the inside of the seat pad in a first lateral direction that is parallel to the loading surface, is formed. A longitudinal slit portion is provided at an end portion of the lateral slit portion, in a second lateral direction that is orthogonal to the first lateral direction and that is parallel to the loading surface. The longitudinal slit portion extends from the lateral slit portion towards the loading surface in a thickness direction that is orthogonal to the loading surface.

Advantageous Effects of Invention

According to the present invention, it is possible to improve the sitting comfort.

DESCRIPTION OF EMBODIMENTS

First Embodiment

Herebelow, a seat pad 10 according to a first embodiment of the present invention will be explained with reference to FIGS. 1 to 3.

Figure 1:
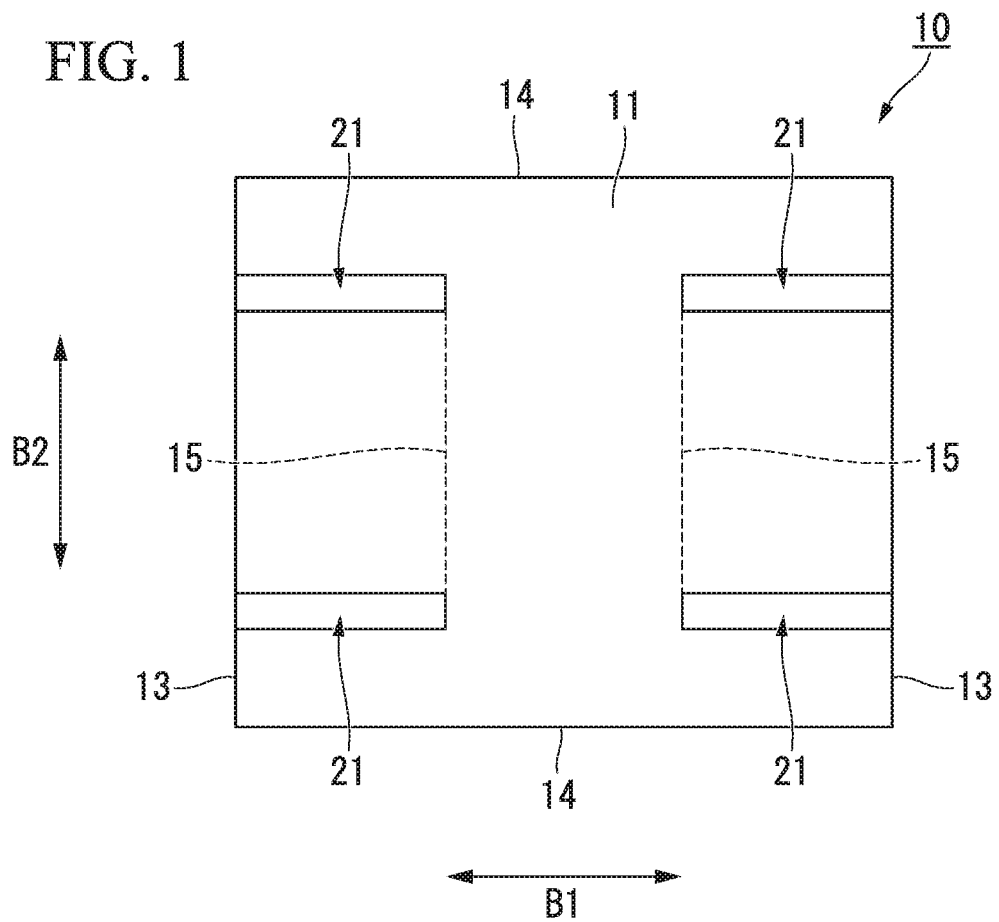
FIG. 1 is a plan view of a seat pad according to a first embodiment of the present invention.
Figure 2:
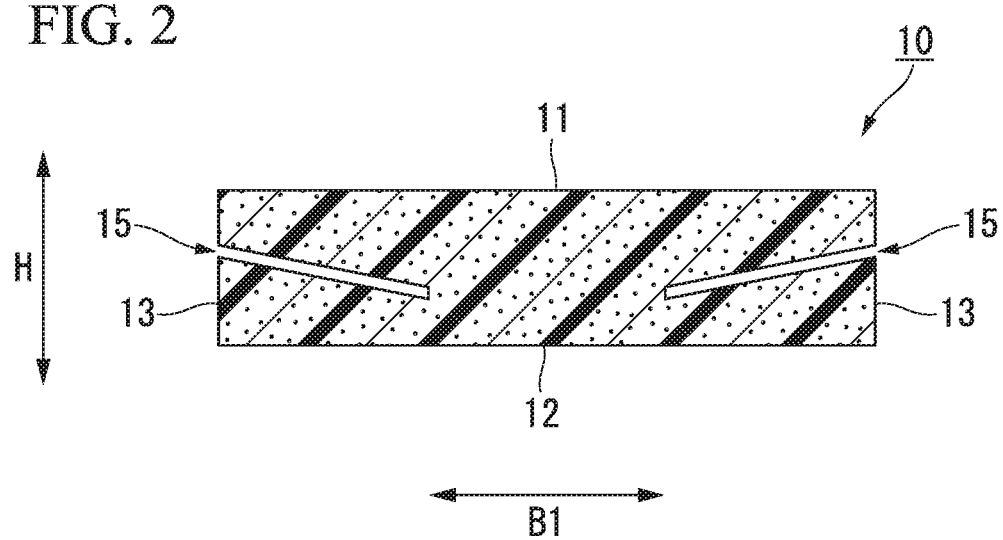
FIG. 2 is a section view of the seat pad illustrated in FIG. 1.

As illustrated in FIGS. 1 and 2, the seat pad 10 is formed from a foam molded body. The foam molded body may be a soft resin foam molded body such as, for example, a soft polyurethane foam (soft resin) or the like, that is molded by foaming a resin material. In the illustrated example, the seat pad 10 is integrally formed from the same material.

The seat pad 10 is used, for example, as a seat installed in an automobile (vehicle). The seat pad 10 comprises a sitting surface 11 (loading surface) with which a passenger comes into contact when sitting on the seat. In the present embodiment, the seat pad 10 may be used as a cushion pad or a back pad.

When the seat pad 10 is used as a cushion pad is used, the sitting surface 11 faces upwards, in the vertical direction, when the seat pad 10 is installed in an automobile. In this case, the weight of the passenger acts on the seat pad 10 from above. Additionally, when the seat pad 10 is used as a back pad, the sitting surface 11 faces towards the front of the automobile when the seat pad 10 is installed in the automobile. In this case, the weight of the passenger acts on the seat pad 10 from the front.

The seat pad 10 is formed in the shape of a flattened rectangular parallelepiped. The direction orthogonal to the sitting surface 11 on the seat pad 10 is the thickness direction H of the seat pad 10. On the seat pad 10, the surface facing towards the side opposite to the sitting surface (the side opposite to the loading surface) in the thickness direction H is the installation surface 12 (rear surface) of the seat pad 10.

The seat pad 10 is formed so as to be rectangular in a plan view of the seat pad 10. The rectangle extends in a first lateral direction B1 and a second lateral direction B2 (restriction direction) that are parallel to the sitting surface 11 and that are orthogonal to each other. The side surfaces of the seat pad 10 comprise first side surfaces 13 that extend in a direction orthogonal to the first lateral direction B1 and second side surfaces 14 that extend in a direction orthogonal to the second lateral direction B2. The first lateral direction B1 may, for example, be either the left-right direction or the front-rear direction of the automobile.

A lateral slit portion 15 that extends from the outside towards the inside of the seat pad 10 in the first lateral direction B1 is formed in the seat pad 10. Lateral slit portions 15 are provided separately in parts of the seat pad 10 that are located on both sides in the first lateral direction B1, and are not provided in the central portion in the first lateral direction B1. The lateral slit portions 15 extend from the outside towards the inside of the seat pad 10 in a plan view of the seat pad 10.

The end portion of a lateral slit portion 15 on the outside in the first lateral direction B1 opens onto a surface of the seat pad 10. The end portion of a lateral slit portion 15 on the inside in the first lateral direction B1 does not open onto a surface of the seat pad 10. The lateral slit portions 15 open onto the first side surfaces 13, and extend from the first side surfaces 13 towards the inside in the first lateral direction B1.

The sizes of the lateral slit portions 15 in the first lateral direction B1 are the same over their entire lengths in the second lateral direction B2. The lateral slit portions 15 are smaller than the seat pad 10 in the second lateral direction B2, and do not open onto second side surfaces 14. The sizes of the lateral slit portions 15 in the second lateral direction B2 are, for example, approximately 10 to 25 mm.

As shown in FIG. 2, the lateral slit portions 15 gradually progress towards the side opposite to the sitting surface in the thickness direction H as they extend towards the inside in the first lateral direction B1. The heights of the lateral slit portions 15, which are their sizes in the thickness direction H, are the same over the entire lengths thereof in the first lateral direction B1.

Figure 3:
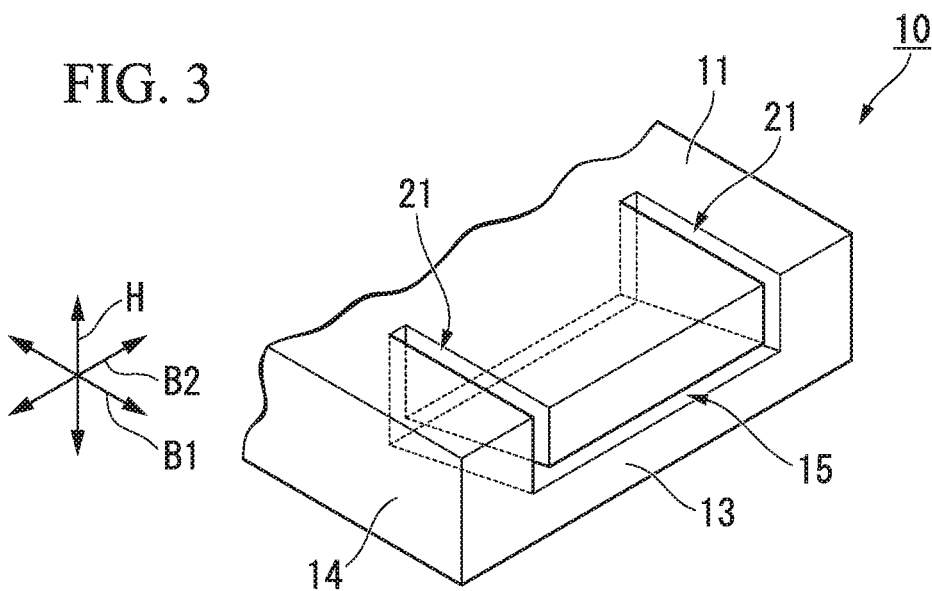
FIG. 3 is a perspective view of an essential portion of the seat pad illustrated in FIG. 1.

As illustrated in FIGS. 1 and 3, longitudinal slit portions 21 are provided at the end portions of the lateral slit portions 15 in the second lateral direction B2. The longitudinal slit portions 21 extend from the lateral slit portions 15 towards the sitting surface 11 in the thickness direction H. The longitudinal slit portions 21 are provided separately on both ends portions of the lateral slit portions 15 in the second lateral direction B2. The longitudinal slit portions 21 are formed over the entire lengths of the lateral slit portions 15 in the first lateral direction B1. The longitudinal slit portions 21 are formed in straight lines extending in the first lateral direction B1 in a plan view of the seat pad 10. The longitudinal slit portions 21 extend from the lateral slit portions 15 and reach the sitting surface 11. The longitudinal slit portions 21 open onto the sitting surface 11 over their entire lengths in the first lateral direction B1. The positions of the longitudinal slit portions 21 in the second lateral direction B2 are the same over their entire lengths in the thickness direction H. The longitudinal slit portions 21 extend straightly in the thickness direction H in a front view seen from the second lateral direction B2.

As explained above, with the seat pad 10 according to the present embodiment, in the seat pad 10, lateral slit portions 15, extending from the outside towards the inside of the seat pad 10 in the first lateral direction B1, are formed. Therefore, when a passenger sits on the sitting surface 11 (loading surface), the seat pad 10 is deformed so that the lateral slit portions 15 are narrowed in the thickness direction H, thereby limiting the hardness that is felt on the seat pad 10 while also allowing the seat pad 10 to sag by an appropriate amount. Due thereto, the sitting comfort, for example, when sitting or when cornering, can be improved.

Herebelow, the portion of the seat pad 10 that is located between the sitting surface 11 and the lateral slit portions 15 will be referred to as the pressure-receiving deformation portion.

Additionally, longitudinal slit portions 21 are formed at the end portions of the lateral slit portions 15 in the second lateral direction B2. Therefore, when a passenger sits on the sitting surface 11, the pressure-receiving deformation portion can be deformed by elongation towards the outside in the second lateral direction B2 so as to narrow the longitudinal slit portions 21 in the second lateral direction B2. Due thereto, the seat pad 10 can be deformed so as to enclose the passenger on the sitting surface 11 from the outside in the second lateral direction B2, thereby further improving the sitting comfort.

When the lateral slit portions 15 and the longitudinal slit portions 21 open onto surfaces of the seat pad 10 as in the present embodiment, the pressure-receiving deformation portion of the seat pad 10 can be made to easily deform independently of the other parts. Therefore, when cores for forming the lateral slit portions 15 in a die for forming the seat pad 10 are removed from the seat pad 10, it is possible to actively deform the pressure-receiving deformation portion so as to prevent an excessive load from being applied to the pressure-receiving deformation portion. Due thereto, the seat pad 10 can be conveniently and precisely formed.

Second Embodiment

Figure 4:
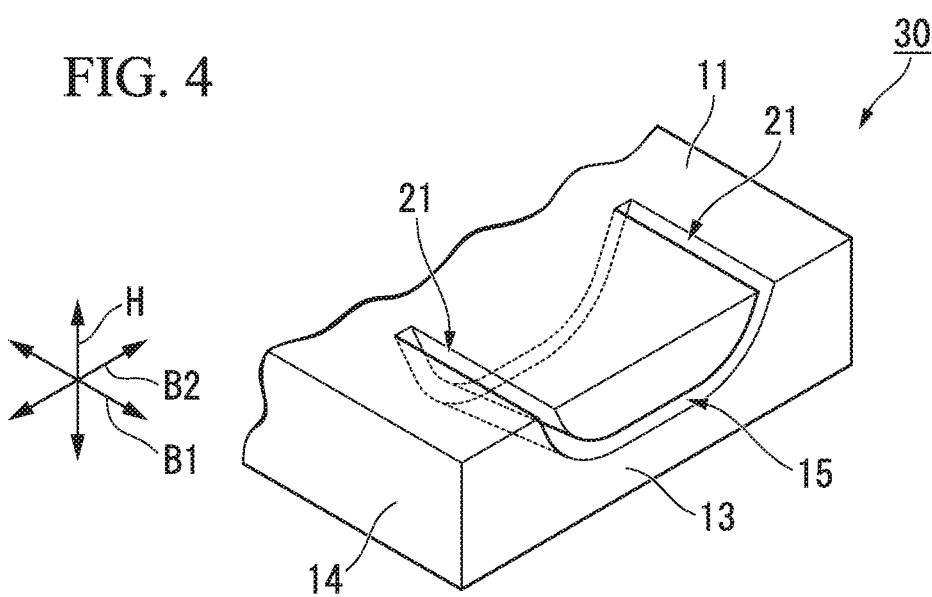
FIG. 4 is a perspective view of an essential portion of a seat pad according to a second embodiment of the present invention.

Next, a second embodiment of the seat pad 30 according to the present invention will be explained with reference to FIG. 4.

In this second embodiment, the portions that are the same as the constituent elements in the first embodiment will be assigned the same reference signs, and their explanations will be omitted. The description will instead center on the differences.

In the seat pad 30 according to the present embodiment, the longitudinal slit portions 21 gradually progress towards the outside in the second lateral direction B2 as they extend towards the sitting surface 11 in the thickness direction H. The longitudinal slit portions 21 extend in directions that are inclined with respect to the thickness direction H in a front view seen from the second lateral direction B2. A pair of longitudinal slit portions 21 gradually become more distant from each other in the second lateral direction B2 as they extend towards the sitting surface 11 in the thickness direction H.

Third Embodiment

Figure 5:
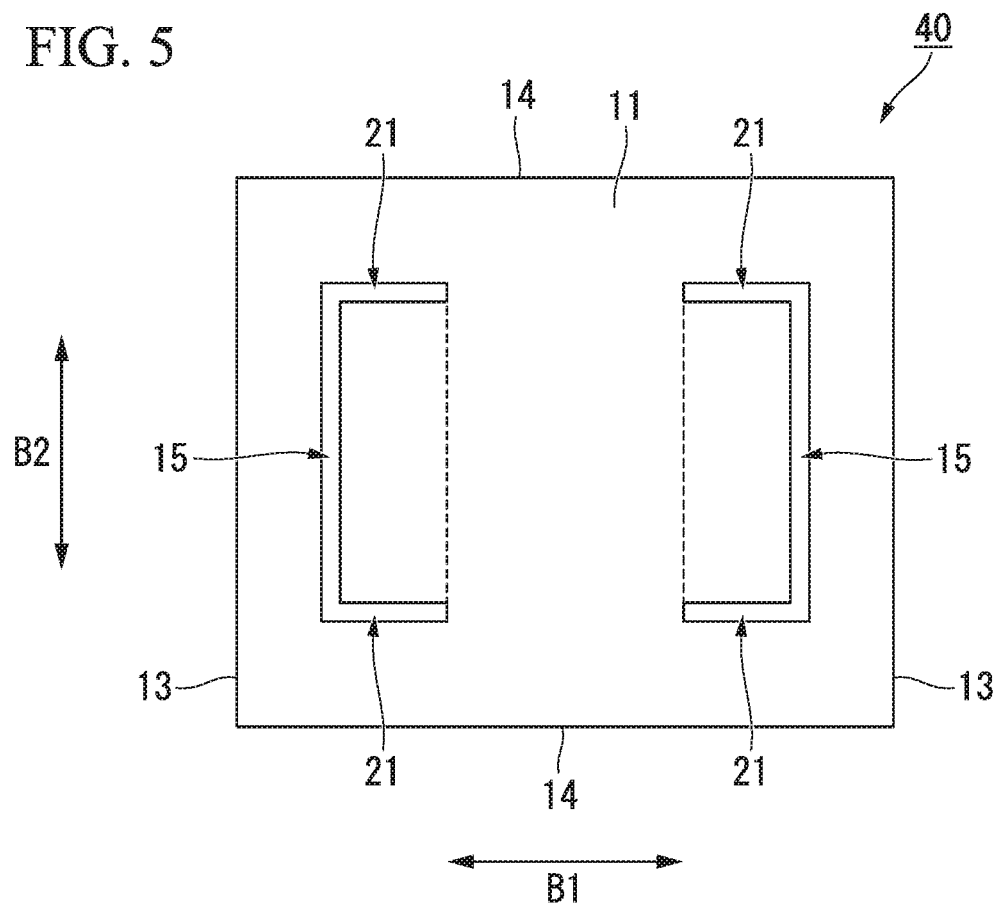
FIG. 5 is a plan view of a seat pad according to a third embodiment of the present invention.
Figure 6:
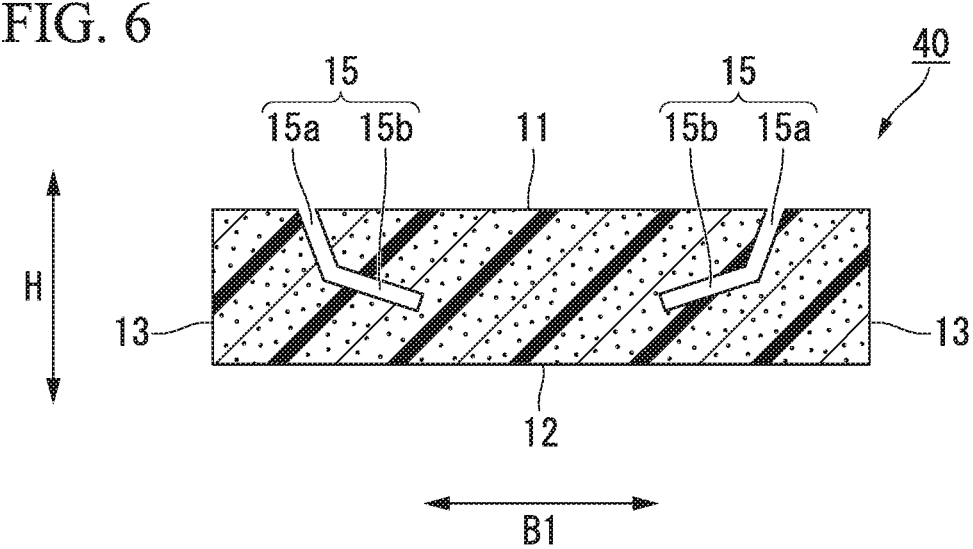
FIG. 6 is a section view of the seat pad illustrated in FIG. 5.

Next, a seat pad 40 according to a third embodiment of the present invention will be explained with reference to FIGS. 5 and 6.

In this third embodiment, the portions that are the same as the constituent elements in the first embodiment will be assigned the same reference signs, and their explanations will be omitted. The description will instead center on the differences.

In the seat pad 40 according to the present embodiment, the lateral slit portions 15 comprise steep incline portions 15a located to the outside the first lateral direction B1, and shallow incline portions 15b located to the inside in the first lateral direction B1. The lateral slit portions 15 are formed by connecting the steep incline portions 15a and the shallow incline portions 15b in the first lateral direction B1. The lateral slit portions 15 open onto the sitting surface 11.

Next, a die 50 (seat pad production device) for forming the seat pad 40 according to the present embodiment will be explained with reference to FIGS. 7 and 8.

Figure 7:
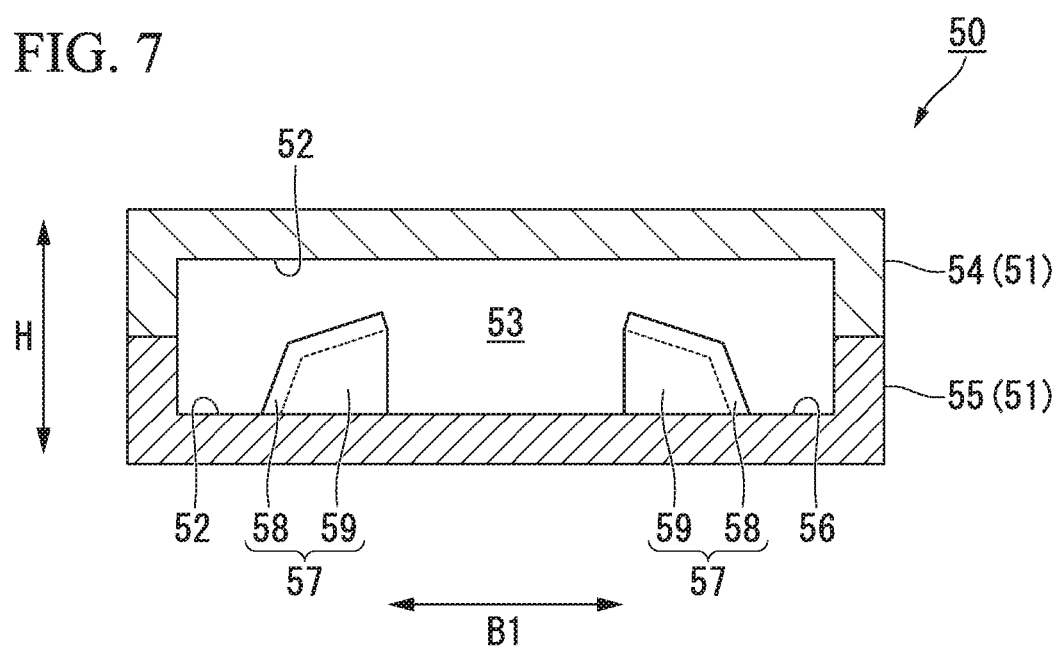
FIG. 7 is a section view of a die for forming the seat pad illustrated in FIG. 5.

As illustrated in FIG. 7, the die 50 comprises a plurality of molds 51 and a cavity 53. The cavity 53 is delimited, between the plurality of molds 51, by cavity surfaces 52 of the plurality of molds 51. The cavity 53 is formed so as to be in the same shape and the same size as the seat pad 40. In the present embodiment, an upper mold 54 and a lower mold 55 are provided as the plurality of molds 51. A sitting surface formation portion 56 (loading surface formation portion) for forming the sitting surface 11 of the seat pad 40 is provided in the cavity surface 52 of the lower mold 55. In other words, the cavity surface 52 is provided with a sitting surface formation portion 56. The plurality of molds 51 open and close in the thickness direction H (opening/closing direction of the plurality of molds) along the vertical direction, orthogonal to the sitting surface formation portion 56.

Cores 57 for forming the lateral slit portions 15 and the longitudinal slit portions 21 are provided inside the cavity 53. The cores 57 are removably attached to a cavity surface 52. The cores 57 are attached to the cavity surface 52 of the lower mold 55, on the sitting surface formation portion 56 in the illustrated example. The cores 57 are arranged as a pair that is spaced in the first lateral direction B1 parallel to the sitting surface formation portion 56. The pair of cores 57 are formed so as to be the same shape and the same size as each other, and are arranged symmetrically in the first lateral direction B1. The cores 57 comprise lateral slit formation portions 58 for forming the lateral slit portions 15, and longitudinal slit formation portions 59 for forming the longitudinal slit portions 21.

The lateral slit formation portions 58 extend from the outside towards the inside of the cavity 53 in the first lateral direction B1. The lateral slit formation portions 58 protrude from a cavity surface 52 into the cavity 53. In the illustrated example, the lateral slit formation portions 58 protrude into the cavity 53 from the sitting surface formation portion 56 of a cavity surface 52. The lateral slit formation portions 58 gradually become more distant from the sitting surface formation portion 56 in the thickness direction H as they extend from the outside towards the inside in the first lateral direction B1. The lateral slit formation portions 58 are formed in the shape of plates having front and rear surfaces facing in the thickness direction H.

Figure 8:
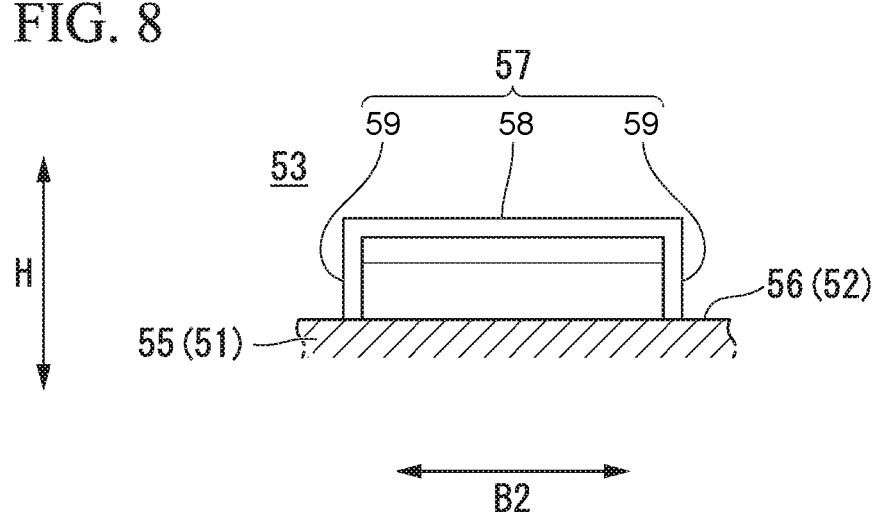
FIG. 8 is a front view of a core in the die illustrated in FIG. 7.

As illustrated in FIG. 8, the longitudinal slit formation portions 59 are provided, on the lateral slit formation portions 58, at end portions in the second lateral direction B2 orthogonal to the first lateral direction B1 and parallel to the sitting surface formation portion 56. The longitudinal slit formation portions 59 extend from the end portions towards the sitting surface formation portion 56 in the thickness direction H. The longitudinal slit formation portions 59 are provided separately at the end portions of the lateral slit formation portions 58 in the second lateral direction B2. The longitudinal slit formation portions 59 are formed over the entire lengths, in the first lateral direction B1, of the lateral slit formation portions 58. The longitudinal slit formation portions 59 extend from the lateral slit formation portions 58 and reach the sitting surface formation portion 56.

In the seat pad production method using the die 50, a foam raw material is foamed inside the cavity 53 to form the seat pad 40. Thereafter, the plurality of molds 51 are opened, and the molds 51 and cores 57 are released from the seat pad 40. Due thereto, the seat pad 40 is formed.

As explained above, with the die 50 according to the present embodiment, lateral slit portions 15 can be formed by the lateral slit formation portions 58 and longitudinal slit portions 21 can be formed by the longitudinal slit formation portions 59. Therefore, a seat pad 40 that can improve sitting comfort, like the aforementioned seat pad 40, is able to be reliably molded.

Additionally, the lateral slit formation portions 58 protrude from a cavity surface 52 into the cavity 53, and the longitudinal slit formation portions 59 extend from the lateral slit formation portions 58 and reach the sitting surface formation portion 56. Therefore, both the lateral slit formation portions 58 and the longitudinal slit formation portions 59 can be exposed from the surface of the seat pad 40 formed inside the cavity 53. Due thereto, the seat pad 40 can be easily released from the cores 57.

Furthermore, the cores 57 are removably attached to a cavity surface 52, so the seat pad 40 can be even more easily released from the cores 57.

Fourth Embodiment

Next, a seat pad 70 according to a fourth embodiment of the present invention will be explained with reference to FIGS. 9 to 11.

In this fourth embodiment, the portions that are the same as the constituent elements in the first embodiment will be assigned the same reference signs, and their explanations will be omitted. The description will instead center on the differences.

Figure 9:
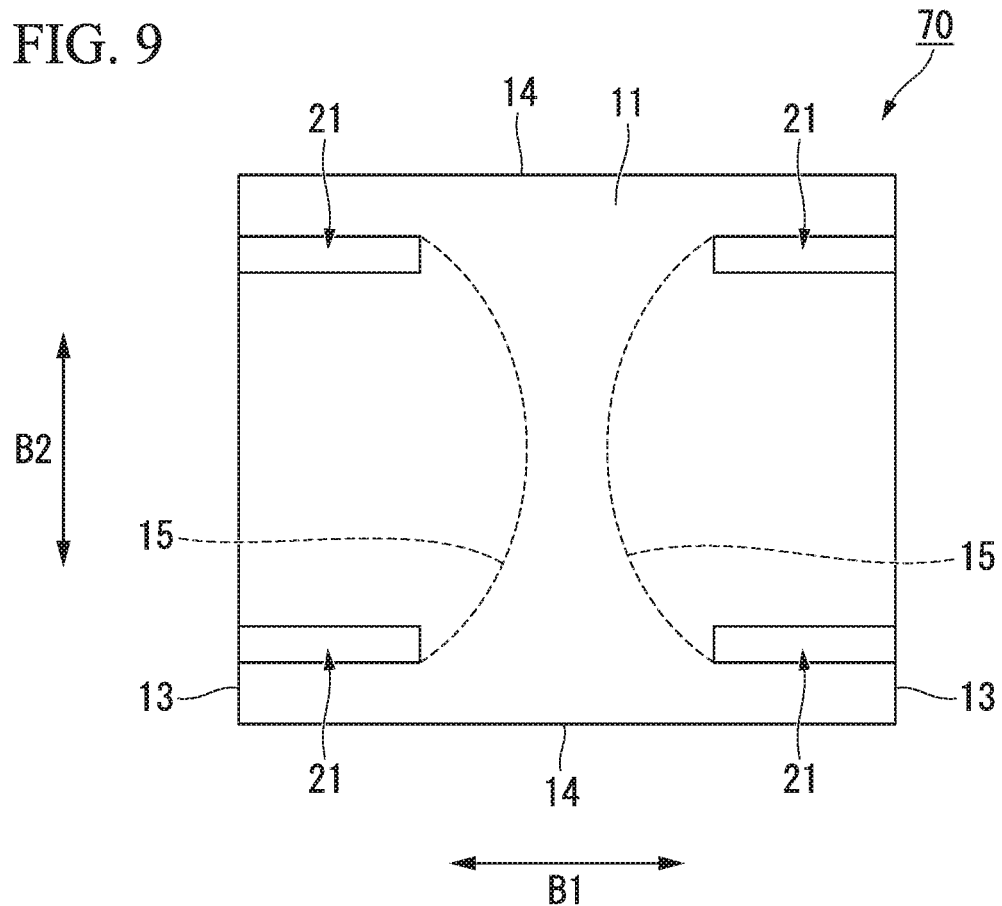
FIG. 9 is a plan view of a seat pad according to a fourth embodiment of the present invention.

As illustrated in FIG. 9, in the seat pad 70 according to the present embodiment, the lateral slit portions 15 become gradually longer in the first lateral direction B1 as they extend from the outside towards the inside in the second lateral direction B2. The end portions of the lateral slit portions 15 towards the inside in the first lateral direction B1 are curved so as to be convex towards the inside in the first lateral direction B1 in a plan view of the seat pad 70.

Figure 11:
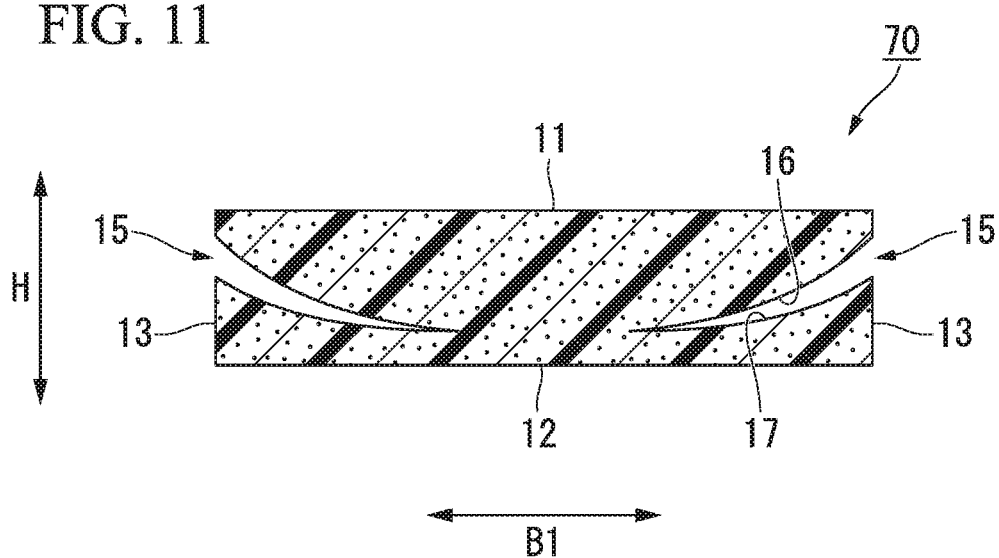
FIG. 11 is a section view of the seat pad illustrated in FIG. 9.

As illustrated in FIG. 11, the lateral slit portions 15, at least in part, become gradually smaller in the thickness direction from the outside towards the inside of the seat pad 70 in the first lateral direction B1. In the illustrated example, the lateral slit portions 15 become gradually smaller in the thickness direction H from the outside towards the inside of the seat pad 70 along their entire lengths in the first lateral direction B1. The lateral slit portions 15 are formed so as to be in the shape of triangles that are convex towards the inside in the first lateral direction B1 in a section view of the seat pad 10 from the second lateral direction B2.

The lateral slit portions 15 are curved so as to be convex in the thickness direction H. In the illustrated example, the lateral slit portions 15 are curved so as to be convex towards the side opposite to the sitting surface in the thickness direction H. The end portions of the lateral slit portions 15 towards the inside in the first lateral direction B1 are located further towards the side opposite to the sitting surface in the thickness direction H than the end portions of the lateral slit portions 15 towards the outside in the first lateral direction B1. The lateral slit portions 15 are curved so as to conform to the external shape of a seated passenger.

Figure 10:
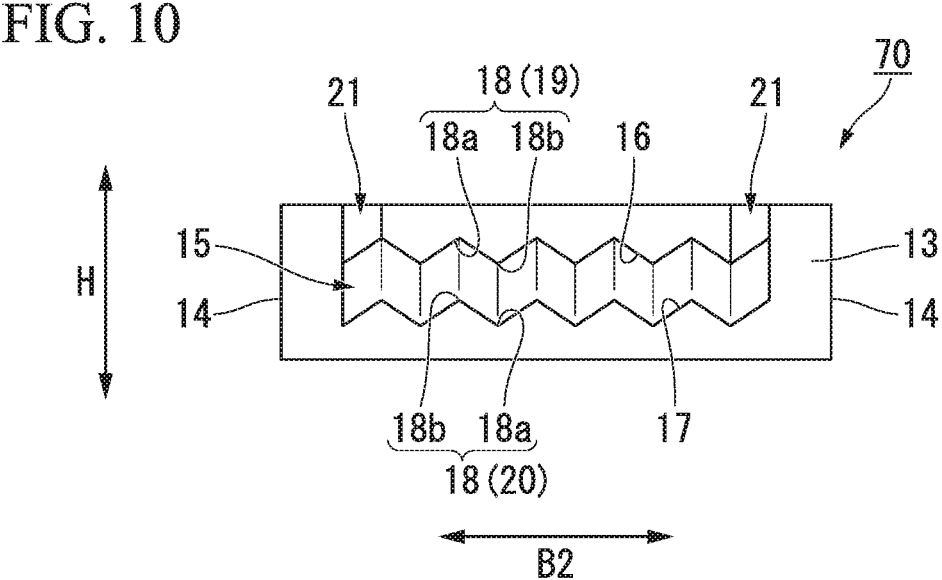
FIG. 10 is a side view of the seat pad illustrated in FIG. 9.

As illustrated in FIG. 10, the inner surfaces delimiting the lateral slit portions 15 comprise a first inner surface 16 positioned on the side towards the sitting surface 11 in the thickness direction H, and a second inner surface 17 positioned on the side opposite to the sitting surface in the thickness direction H. Recess/protrusion portions 18 that are arranged in the second lateral direction B2 are formed on the first inner surface 16 and the second inner surface 17. The recess portions 18a and the protrusion portions 18b forming the recess/protrusion portions 18 extend in the first lateral direction B1. The recess portions 18a and the protrusion portions 18b are formed in the shape of triangles in a front view seen from the first lateral direction B1.

A first recess/protrusion portion 19 is formed as a recess/protrusion portion 18 in the first inner surface 16. A second recess/protrusion portion 20 is formed as a recess/protrusion portion 18 in the second inner surface 17. In the first recess/protrusion portion 19 and the second recess/protrusion portion 20, the shapes of waves formed by the surfaces thereof are the same as each other in a front view seen from the first lateral direction B1. The wave shapes are the same as each other in terms of the periods in the second lateral direction B2 and the amplitudes in the thickness direction H. The first recess/protrusion portions 19 and the second recess/protrusion portions 20 are arranged so that the recess portions 18a face the protrusion portions 18b in the thickness direction H.

As explained above, with the seat pad 70 according to the present embodiment, the lateral slit portions 15, at least in part, become gradually smaller in the thickness direction H from the outside towards the inside of the seat pad 70 in the first lateral direction B1. Therefore, parts of the lateral slit portions 15 that are relatively larger in the thickness direction H may be positioned at the parts of the sitting surface 11 that are located on the outside of the seat pad 70 where the weight does not tend to be applied when a passenger sits. Due thereto, it is possible to make the seat pad 70 evenly sag over a wide range of the sitting surface 11, thereby allowing the sitting comfort to be further improved.

Additionally, the lateral slit portions 15 become gradually smaller in the thickness direction H from the outside towards the inside of the seat pad 70 over their entire lengths in the first lateral direction B1. Therefore, the level of deformation of the seat pad 70 can be gradually changed in the first lateral direction B1, and it is possible to effectively suppress the occurrence of an unnatural sensation when the seat pad 70 sags.

Additionally, the lateral slit portions 15 are curved so as to be convex in the thickness direction H, so the lateral slit portions 15 can be made to more easily conform to the external shape of a passenger sitting on the sitting surface 11. Due thereto, it is possible to cause the seat pad 70 to sag in conformity with the external shape of the passenger and to improve the sitting comfort by raising the sensation of fitting.

When the lateral slit portions 15 are curved so as to be convex towards the side opposite to the sitting surface in the thickness direction H as in the present embodiment, the seat pad 70 can be made to effectively sag in conformity with the external shape of the passenger. Due thereto, the sitting comfort can be improved by raising the sensation of fitting.

Additionally, in the first recess/protrusion portion 19 and the second recess/protrusion portion 20, the recess portions 18a face the protrusion portions 18b in the thickness direction H. Therefore, when a passenger sits on the sitting surface 11 and the lateral slit portions 15 are narrowed in the thickness direction H, the first recess/protrusion portions 19 and the second recess/protrusion portions 20 can be made to engage with each other. Due thereto, it is possible to suppress relative displacement, in the second lateral direction B2, between the parts located on both sides of the lateral slit portions 15 in the thickness direction H, when the passenger sits. As a result thereof, the sitting comfort can be further improved.

Additionally, the lateral slit portions 15 become gradually longer in the first lateral direction B1 as they extend from the outside towards the inside in the second lateral direction B2. Therefore, in the sitting surface 11 the parts of the lateral slit portions 15 located in the central portion in the second lateral direction B2 can be made to more actively deform than the other parts of the lateral slit portions 15 located at both ends in the second lateral direction B2. Due thereto, the seat pad 70 can be deformed so as to enclose the passenger on the sitting surface 11 from the outside in the second lateral direction B2, thereby further improving the sitting comfort.

Fifth Embodiment

Figure 12:
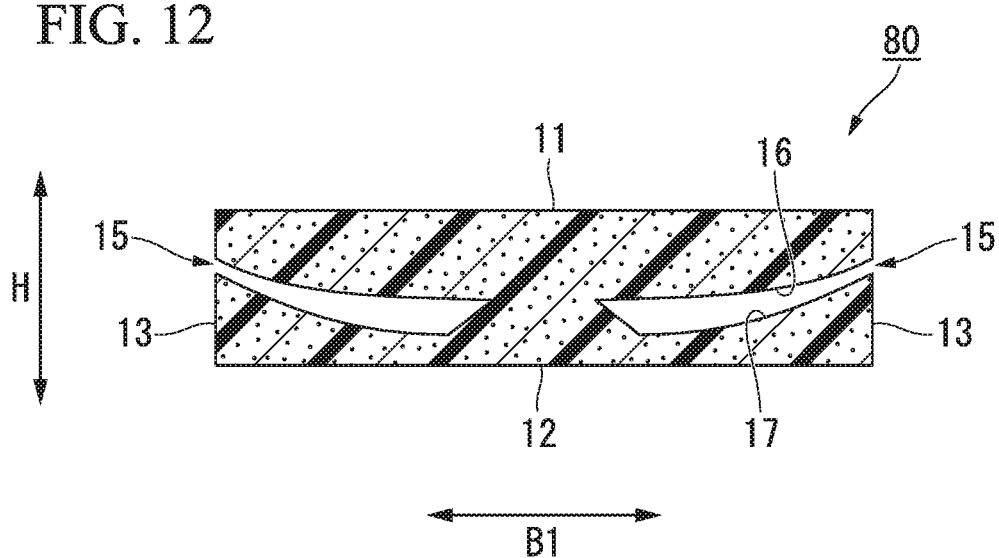
FIG. 12 is a section view of a seat pad according to a fifth embodiment of the present invention.

Next, a seat pad 80 according to a fifth embodiment of the present invention will be explained with reference to FIG. 12.

In this fifth embodiment, the portions that are the same as the constituent elements in the fourth embodiment will be assigned the same reference signs, and their explanations will be omitted. The description will instead center on the differences.

In the seat pad 80 according to the present embodiment, the lateral slit portions 15, at least in part, become gradually larger in the thickness direction H from the outside towards the inside of the seat pad 80 in the first lateral direction B1. In the illustrated example, the lateral slit portions 15 become gradually larger in the thickness direction H from the outside towards the inside of the seat pad 80 along their entire lengths in the first lateral direction B1. The lateral slit portions 15 are formed so as to be in the shape of triangles that are convex towards the outside in the first lateral direction B1 in a section view of the seat pad 80 seen from the second lateral direction B2.

As explained above, with the seat pad 80 according to the present embodiment, the lateral slit portions 15, at least in part, become gradually larger in the thickness direction H from the outside towards the inside of the seat pad 80 in the first lateral direction B1. Therefore, the parts of the sitting surface 11 that are located towards the inside of the seat pad 80 where the weight tends to be applied when a passenger sits can be actively deformed relative to parts located towards the outside of the seat pad 80. Due thereto, for example, the seat pad 80 can be deformed so as to enclose a passenger on the sitting surface 11 from the outside in the first lateral direction B1 even without adjusting the size of the seat pad 80 in the thickness direction H or the like. Due thereto, the sitting comfort can be further improved.

Additionally, the lateral slit portions 15 become gradually larger in the thickness direction H from the outside towards the inside of the seat pad 80 over their entire lengths in the first lateral direction B1. Therefore, the level of deformation of the seat pad 80 can be gradually changed in the first lateral direction B1, and it is possible to effectively suppress the occurrence of an unnatural sensation when the seat pad 80 sags.

Sixth Embodiment

Figure 13:
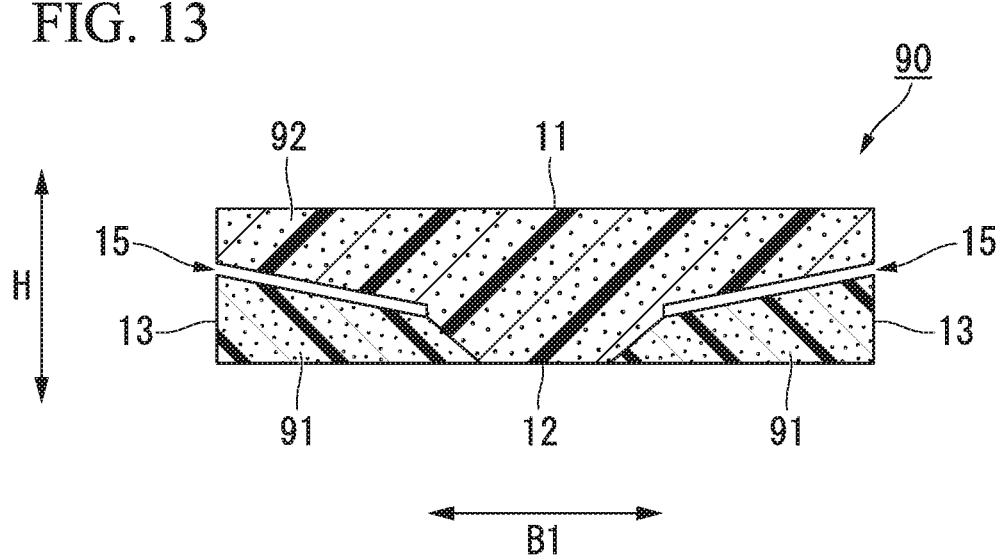
FIG. 13 is a section view of a seat pad according to a sixth embodiment of the present invention.

Next, a seat pad 90 according to a sixth embodiment of the present invention will be explained with reference to FIG. 13.

In this sixth embodiment, the portions that are the same as the constituent elements in the first embodiment will be assigned the same reference signs, and their explanations will be omitted. The description will instead center on the differences.

The seat pad 90 according to the present embodiment is formed integrally from different types of materials. In the illustrated example, the seat pad 90 has layers 91 and 92, of mutually different hardness, stacked in the thickness direction H.

The seat pad 90 comprises a base layer 91 on the side towards the installation surface 12, and a cushion layer 92 on the side towards the sitting surface 11. The base layer 91 and the cushion layer 92 are separated in the thickness direction H by the lateral slit portions 15. On the seat pad 90, the part located on the side of the lateral slit portions 15 towards the installation surface 12 forms the base layer 91, and the part located on the side of the lateral slit portions 15 towards the sitting surface 11 forms the cushion layer 92.

Additionally, in the present embodiment, the sitting surface 11 is formed by the cushion layer 92. The hardness of the cushion layer 92 is lower than the hardness of the base layer 91.

In the illustrated example, the base layer 91 is provided in a limited fashion on both sides, in the first lateral direction B1, of the seat pad 90. The central portion of the seat pad 90 in the first lateral direction B1 is composed of the cushion layer 92. In other words, the cushion layer 92 is formed in the shape of a T that protrudes towards the installation surface 12 in a section view of the seat pad 10 seen from the second lateral direction B2. In this section view, base layers 91 are connected separately, on both sides in the first lateral direction B1, to the portion of the cushion layer 92 that protrudes towards the installation surface 12.

As explained above, with the seat pad 90 according to the present embodiment, the base layer 91 and the cushion layer 92 are separated in the thickness direction H by the lateral slit portions 15. Therefore, when a passenger sits on the sitting surface 11 and the cushion layer 92 deforms, it is possible to suppress the deformation of the base layer 91 along with the cushion layer 92. Due thereto, it is possible to more easily take advantage of the properties of the respective layers 91 and 92.

Additionally, in this way, it is possible to suppress deformation of the base layer 91 along with the cushion layer 92 when a passenger sits. In addition thereto, in the present embodiment, the lateral slit portions 15 are provided separately at parts of the seat pad 90 located on both sides in the first lateral direction B1. Therefore, it is possible to suppress the occurrence of stiffness (an unnatural sensation) at the central portion of the sitting surface 11 in the first lateral direction B1, on which a load tends to be applied when a passenger sits. Due thereto, it is possible to more easily take advantage of the properties of the respective layers 91 and 92.

As described above, with the seat pad 90 according to the present embodiment, it is possible to more easily take advantage of the properties of the layers 91 and 92, and in the present embodiment, the hardness of the cushion layer 92 is lower than the hardness of the base layer 91. Therefore, it is possible to obtain a sensation of holding the passenger by means of the base layer 91, while obtaining a sensation of fitting the passenger by means of the cushion layer 92. Due thereto, the sitting comfort can be effectively improved.

The technical scope of the present invention is not to be construed as being limited to the aforementioned embodiments, and various modifications can be made within a range not departing from the spirit of the present invention.

For example, in the aforementioned embodiments, the seat pads 10, 30, 40, 70 and 80 are formed integrally from the same material, but the present invention is not limited thereto. For example, the seat pads 10, 30, 40, 70 and 80 may be formed integrally from different types of materials.

In the aforementioned embodiments, the lateral slit portions 15 are separately provided at portions on both sides, in the first lateral direction B1, of the seat pads 10, 30, 40, 70, 80 and 90, but the present invention is not limited thereto. A lateral slit portion 15 may be provided on only one side in the first lateral direction B1. The present invention may be modified, as appropriate, to other embodiments in which one or a plurality of lateral slit portions 15 are provided.

In the aforementioned embodiments, the lateral slit portions 15 open onto the first side surfaces 13, but they need not open onto the first side surfaces 13.

In the aforementioned embodiments, the recess/protrusion portions 18 are arranged in the second lateral direction B2, but the present invention is not limited thereto. For example, the recess/protrusion portions 18 may be arranged in the first lateral direction B1. The present invention may be modified, as appropriate, to other embodiments in which recess/protrusion portions 18 that are arranged in the restriction direction parallel to the sitting surface 11 are formed on both the first inner surfaces 16 and the second inner surfaces 17 of the horizontal slit portions 15.

The seat pads 10, 30, 40, 70, 80 and 90 may be used as seat pads for various applications, such as chairs for indoor use, or cushions for beds or the like. Furthermore, the seat pads 10, 30, 40, 70, 80 and 90 need not be limited to being for seating humans, and may have a loading surface for loading luggage or the like.

Aside therefrom, the constituent elements in the aforementioned embodiment may be replaced, as appropriate, with well-known constituent elements, within a range not departing from the spirit of the present invention, or the aforementioned modification examples may be combined as appropriate.

INDUSTRIAL APPLICABILITY

According to the seat pad of the present invention, it is possible to improve the sitting comfort.

REFERENCE SIGNS LIST

10, 30, 40, 70, 80, 90 Seat pad
11 Sitting surface (loading surface)
15 Lateral slit portion
16 First inner surface
17 Second inner surface
18 Recess/protrusion portion
18*a* Recess portion
18*b* Protrusion portion
19 First recess/protrusion portion
20 Second recess/protrusion portion
21 Longitudinal slit portion
50 Die (seat pad production device)
51 Mold
52 Cavity surface
53 Cavity
56 Sitting surface formation portion (loading surface formation portion)
57 Core
58 Lateral slit formation portion
59 Longitudinal slit formation portion
B1 First lateral direction
B2 Second lateral direction
H Thickness direction

The invention claimed is:

1. A seat pad having a loading surface and side surfaces, wherein
   a lateral slit portion, extending from a portion of the loading surface or the side surfaces which are orthogonal to a first lateral direction which is a left-right direction of an automobile and is parallel to the loading surface towards a center of the seat pad in the first lateral direction, is formed, the portion of the loading surface is distant from the center of the seat pad in the first lateral direction, and
   a longitudinal slit portion, extending from the lateral slit portion towards the loading surface which is distant from the lateral slit portion in a thickness direction that is orthogonal to the loading surface, is provided at an end portion of the lateral slit portion, in a second lateral direction that is orthogonal to the first lateral direction and that is parallel to the loading surface.

2. The seat pad according to claim 1, wherein the lateral slit portion, at least in part, becomes gradually smaller in the thickness direction from the outside towards the inside of the seat pad in the first lateral direction.

3. The seat pad according claim 1, wherein the lateral slit portion, at least in part, becomes gradually larger in the thickness direction from the outside towards the inside of the seat pad in the first lateral direction.

4. The seat pad according to claim 1, wherein the lateral slit portion is curved so as to be convex towards the thickness direction.

5. The seat pad according to claim 1, wherein:
   inside surfaces delimiting the lateral slit portion comprise a first inside surface that is positioned towards the loading surface in the thickness direction, and a second inside surface that is positioned towards the side opposite to the loading surface in the thickness direction;
   recess/protrusion portions that are arranged in a restriction direction parallel to the loading surface are formed respectively on the first inside surface and the second inside surface;
   first recess/protrusion portions are formed as the recess/protrusion portions on the first inside surface;
   second recess/protrusion portions are formed as the recess/protrusion portions on the second inside surface; and
   on the first recess/protrusion portions and the second recess/protrusion portions, the recess portions face the protrusion portions in the thickness direction.

6. The seat pad according to claim 1, wherein the lateral slit portions become gradually longer in the first lateral direction from the outside towards the inside in the second lateral direction.

* * * * *